March 30, 1943.  M. J. KULLA  2,315,433
ANGLE PLATE FOR MACHINE TABLES
Filed March 11, 1942  2 Sheets-Sheet 1
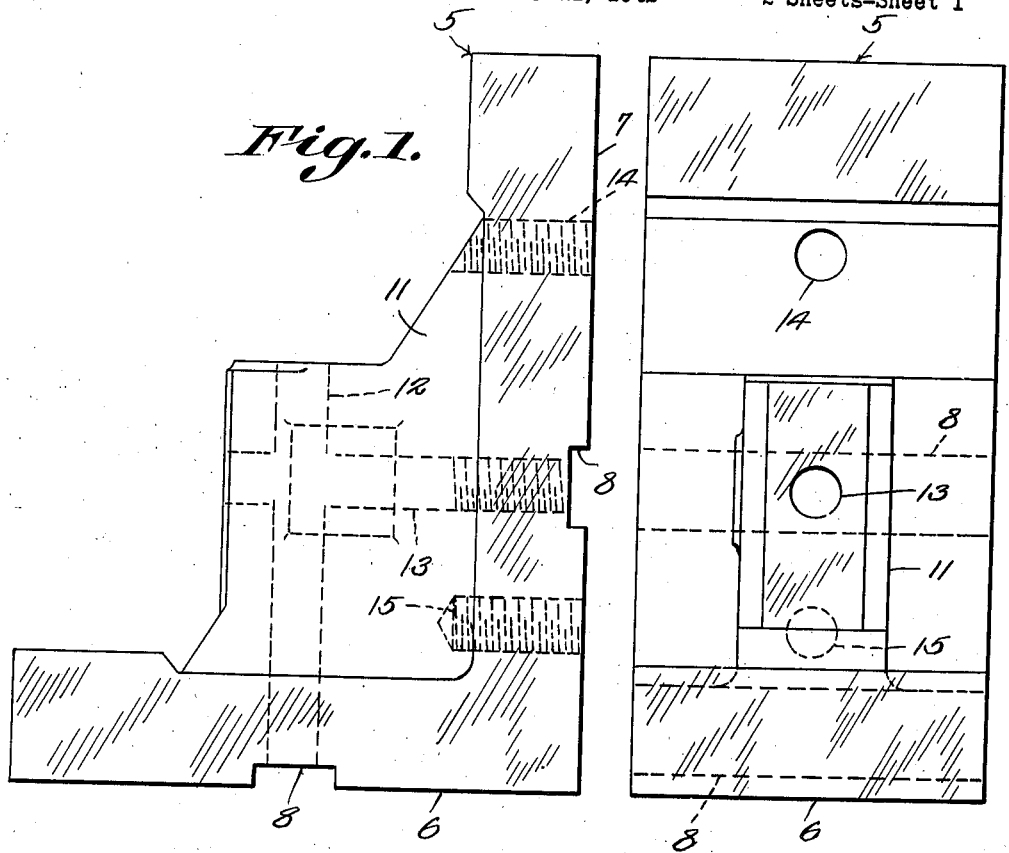
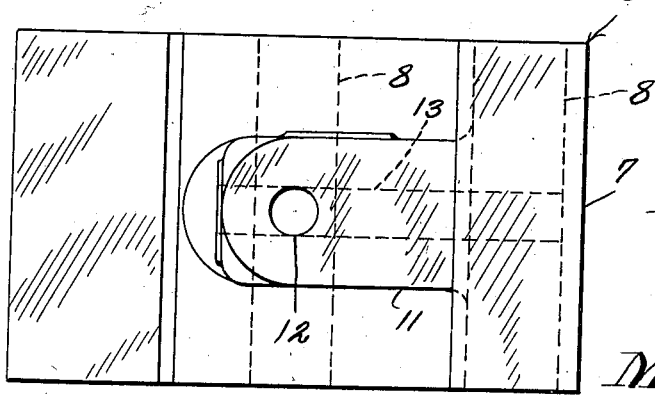
M. J. Kulla
INVENTOR.
BY C. A. Snowles March 30, 1943.   M. J. KULLA   2,315,433
ANGLE PLATE FOR MACHINE TABLES
Filed March 11, 1942   2 Sheets-Sheet 2
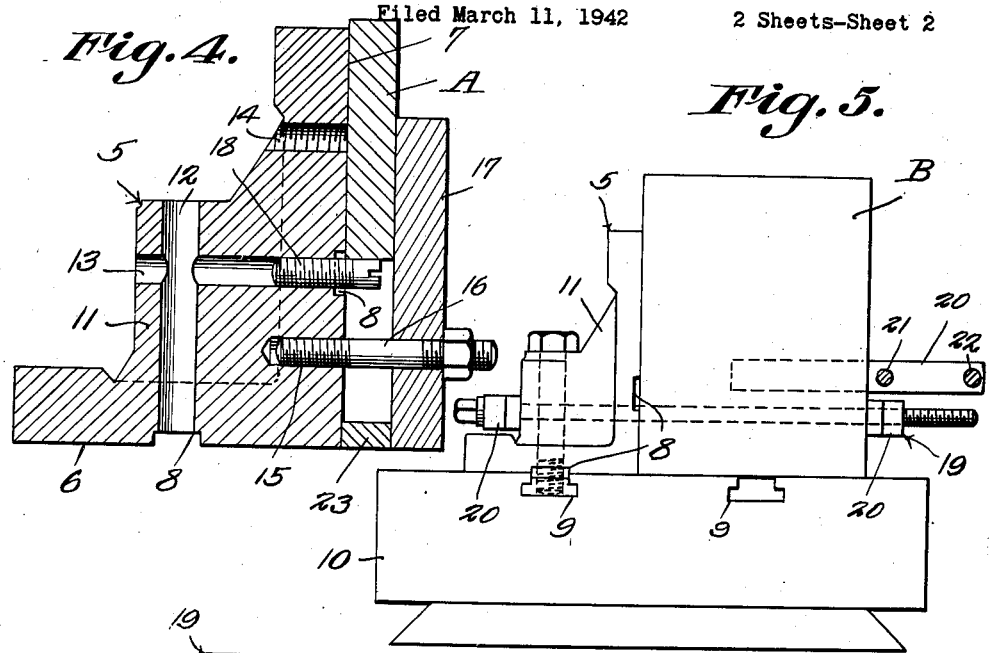
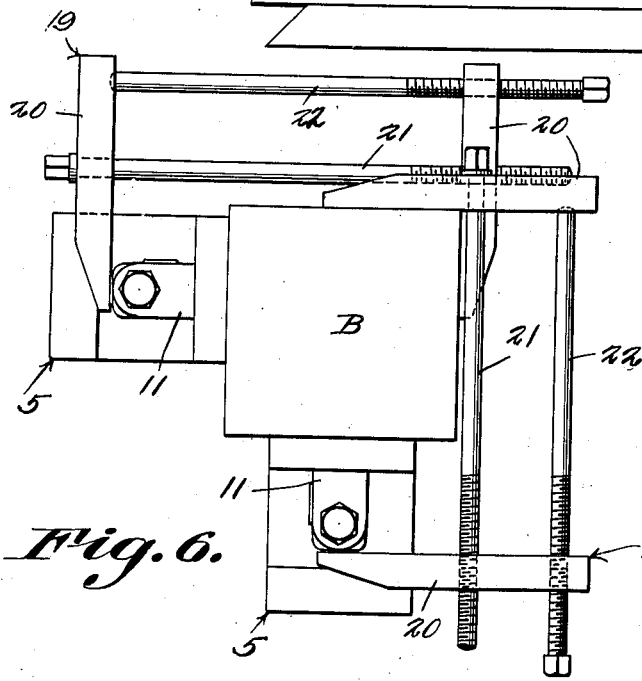
M. J. Kulla
INVENTOR.
BY Patented Mar. 30, 1943

2,315,433

UNITED STATES PATENT OFFICE 2,315,433

ANGLE PLATE FOR MACHINE TABLES

Michael J. Kulla, Cleveland, Ohio

Application March 11, 1942, Serial No. 434,285

1 Claim. (Cl. 90—60)

This invention relates to angle-plate construction, and particularly to angle-plates designed for use in connection with machine tables, the primary object of the invention being to provide a universal angle-plate, so constructed that it may be reversed or moved to various clamping positions, thereby adapting the angle-plate for use in clamping and holding various types of work.

Another object of the invention is to provide angle-plate of this character having means for holding the work to be machined, elevated, while the work is being clamped on the machine table, thereby insuring against the work twisting while the work is being mounted in the angle-plate.

A further object of the invention is the provision of means for preventing twisting of the angle-plate with respect to the machine table, when in use.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of an angle-plate constructed in accordance with the invention.

Figure 2 is front elevational view thereof.

Figure 3 is a plan view of the angle-plate.

Figure 4 is a vertical sectional view through the angle-plate, illustrating the plate as clamping work to be machined.

Figure 5 is an elevational view illustrating the angle-plates used in connection with machine clamps, in clamping a block of metal to be machined.

Figure 6 is a plan view thereof.

Referring to the drawings in detail, the angle-plate comprises a body portion indicated generally by the reference character 5, the body portion having wide work-engaging surfaces 6 and 7, the surfaces 6 and 7 being disposed at right angles with respect to each other. The surface 6, is comparatively short, and is used for clamping small objects, while the surface 7 is appreciably longer than the surface 6, thereby providing a wide surface for clamping wide articles.

Guideways 8 are formed in the surfaces 6 and 7, and are adapted to align with the usual T-shaped guideways 9 formed in the machine table 10, so that the threaded ends of bolts, extended through the angle-plate and guideways, may be seated in nuts, formed with heads that fit within the T-shaped guideways, as clearly shown by Figure 5, thereby clamping the angle-plate in position. Because these guideways 8 are formed in both surfaces 6 and 7 of the angle-plate, it will be seen that the angle-plate may be readily reversed, that is the surface 7 may be positioned on the machine table and secured thereto, while the surface 6 provides a clamping surface for the article under treatment.

An enlarged rib indicated at 11 connects the rear faces of the right angled portions of the angle-plate, the enlarged rib being an integral part of the body portion. The enlarged rib is formed with bores 12 and 13, which bores extend to the guideways 8 and cross each other near the rear surface of the enlarged rib. These bores 12 and 13 accommodate the securing bolts, whereby the angle-plate is secured to a machine table. Threaded openings indicated at 14 and 15 are provided to receive the bolt 16 which also passes through an opening in the clamping plate 17 used in conjunction with the angle-plate in clamping an article. Of course when the angle-plate is used in clamping a relatively small article, it may be desirable to elevate the clamping plate 17 and position the bolt 16 in the opening 14, whereupon a wider portion of the clamping plate will be presented for engagement with the work.

The bores 13 may also be used for the reception of the bolt 18 which provides a rest for the work, which in the present showing is indicated at A in Figure 4 of the drawings, when the work is being clamped by the angle-iron and plate 17. As shown by Figure 6, two of these angle-plates have been shown as secured to a machine table, for clamping the work, which in this showing is in the form of a block indicated at B. Associated with the angle-plates in clamping the block B, are machinist clamps indicated by the reference character 19, the machinist clamps being of the well known construction, embodying spaced jaws 20 that are held in clamping relation with respect to each other, by means of the bolts 21 and 22. In using the machinist clamps, it will be seen that one of the jaws is placed against the outer surface of the enlarged rib of the angle-plate, while the opposite jaw thereof rests against the opposite side of the work or block B.

From the foregoing it will be seen that due to the construction shown and described, I have provided an angle-plate which is especially designed for use in connection with machine tables, the angle-plate being such that it may be readily reversed and positioned in many ways to facilitate the clamping of work to machine tables.

It might be further stated that in the use of the angle-plate, spacing bars such as indicated at 23 and illustrated in Figure 4 of the drawings, are used between the clamping plate 17 and face of the angle-plate in use. These spacing bars hold the lower portions of the clamping plate 17 and cooperating face of the angle-plate properly spaced to insure the gripping of the work to prevent twisting or movement of the work.

What is claimed is:

A reversible clamping plate for machine tables, comprising a body having clamping portions disposed at right angles with respect to each other, one of said right angled portions being substantially longer than the adjacent right angled portion, either of said clamping surfaces adapted to rest on a machine table supporting the plate, a wide rib formed integral with the rear surfaces of the clamping portions, connecting the clamping portions, said rib and clamping portions having bolt openings extending at right angles with respect to each other, in which securing bolts are positioned whereby said clamping plate may be secured to a machine table with either clamping portion resting on the table, and certain of said bolt openings adapted to receive clamping plate securing bolts and wedge supporting bolts.

MICHAEL J. KULLA.